(12) United States Patent
Lee

(10) Patent No.: US 10,999,814 B1
(45) Date of Patent: May 4, 2021

(54) SPATIAL LOCATION PREDICTION METHOD AND DEVICE BY USING ARTIFICIAL INTELLIGENCE

(71) Applicant: AJOU UNIVERSITY INDUSTRY-ACADEMIC COOPERATION FOUNDATION, Suwon-si (KR)

(72) Inventor: Won Chan Lee, Suwon-si (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 0 days.

(21) Appl. No.: 16/892,742

(22) Filed: Jun. 4, 2020

(30) Foreign Application Priority Data

Feb. 24, 2020 (KR) .................. 10-2020-0022555

(51) Int. Cl.
| | |
|---|---|
| *H04W 64/00* | (2009.01) |
| *G01S 1/80* | (2006.01) |
| *G01S 11/06* | (2006.01) |
| *G01S 5/26* | (2006.01) |
| *G01S 5/22* | (2006.01) |
| *H04W 24/00* | (2009.01) |

(52) U.S. Cl.
CPC .............. *H04W 64/006* (2013.01); *G01S 1/80* (2013.01); *G01S 5/22* (2013.01); *G01S 5/26* (2013.01); *G01S 11/06* (2013.01)

(58) Field of Classification Search
CPC ....... H04W 4/02; H04W 4/021; H04W 4/029; H04W 4/30; H04W 4/33; H04W 4/40; H04W 4/80

USPC ...... 455/456.3, 456.1, 456, 457, 446, 452.2, 455/414.1, 414.2, 435.1, 405, 408

See application file for complete search history.

(56) References Cited

U.S. PATENT DOCUMENTS

| | | | |
|---|---|---|---|
| 10,008,090 B2* | 6/2018 | Yuen | H04W 4/029 |
| 10,280,054 B2* | 5/2019 | High | A47F 10/04 |
| 10,740,503 B1* | 8/2020 | Wodrich | G06T 19/006 |

(Continued)

FOREIGN PATENT DOCUMENTS

| | | |
|---|---|---|
| KR | 10-1705227 B1 | 2/2017 |
| KR | 10-1945320 B1 | 2/2019 |

*Primary Examiner* — Joseph Arevalo
(74) *Attorney, Agent, or Firm* — Sughrue Mion, PLLC

(57) ABSTRACT

A device includes a processor; and a memory connected to the processor and storing an artificial intelligence algorithm, first to third location data, wherein the memory stores program instructions which, when executed by the processor, cause the processor to, two-dimensionally map the first location data to a first point according to a preset mapping method, two-dimensionally map the second location data to a second point according to the mapping method, two-dimensionally map the third location data to a third point according to the mapping method, set a reference point, a first reference line, and a second reference line according to a preset method through the first point to the third point, generate movement information about a location where a user has moved from a location corresponding to the reference point by using location information received from a user terminal, and train the artificial intelligence algorithm using the movement information.

12 Claims, 7 Drawing Sheets

(56) References Cited

U.S. PATENT DOCUMENTS

| | | | |
|---|---|---|---|
| 2004/0029558 A1* | 2/2004 | Liu | H04W 64/00 455/404.2 |
| 2012/0190386 A1* | 7/2012 | Anderson | G01S 19/14 455/456.3 |
| 2016/0150378 A1* | 5/2016 | Cui | G01S 19/39 455/457 |
| 2016/0307382 A1* | 10/2016 | Herman | G06K 9/00348 |
| 2018/0020333 A1* | 1/2018 | Gillen | H04W 4/40 |
| 2018/0267540 A1* | 9/2018 | Sonoura | G05D 1/0221 |
| 2018/0315209 A1* | 11/2018 | Murphy-Chutorian | G06K 9/00664 |
| 2019/0072638 A1* | 3/2019 | Wang | H04W 4/029 |
| 2019/0212159 A1* | 7/2019 | Petersen | G01C 21/3453 |

\* cited by examiner

SPATIAL LOCATION PREDICTION METHOD AND DEVICE BY USING ARTIFICIAL INTELLIGENCE

CROSS-REFERENCE TO RELATED APPLICATION

This application claims the benefit of Korean Patent Application No. 10-2020-0022555, filed on Feb. 24, 2020, in the Korean Intellectual Property Office, the disclosures of which are incorporated herein in its entirety by reference.

BACKGROUND

1. Field

The disclosure relates to a method of predicting a user's spatial location and a device thereof, and more particularly, to a method of predicting a user's spatial location using artificial intelligence and a device thereof.

2. Description of the Related Art

Artificial intelligence technology stores data for a specific purpose, abstracts the data, generalizes the abstracted data, and evaluates the generalized data. Through this machine learning process, classification of data properties, numeric prediction, pattern detection, or clustering and decision may be performed.

Positioning technology is technology for positioning a user's location using a wireless signal or the like in a specific space. In particular, a global positioning system (GPS) is closely used in real life for vehicle navigation, military, and broadcasting. However, the GPS is not useful in underground or indoor applications. Therefore, in locations where GPS signals are not reachable, such as indoors or underground, triangular positioning using RF signals and positioning technology through Wifi AP, Beacon, etc. are widely used.

An object of the disclosure is to make a system for predicting a location of a rescued person in advance in the event of a disaster by integrating the above-described artificial intelligence technology and positioning technology.

SUMMARY

Provided are a method of predicting a spatial location using artificial intelligence that may predict a user's location in the event of a disaster by integrating artificial intelligence technology and positioning technology, and a device thereof.

According to an aspect of the inventive concept, a spatial location prediction device includes a memory connected to the processor and storing an artificial intelligence algorithm, first location data, second location data, and third location data, wherein the memory stores program instructions which, when executed by the processor, cause the processor to: two-dimensionally map the first location data to a first point according to a preset mapping method, two-dimensionally map the second location data to a second point according to the mapping method, two-dimensionally map the third location data to a third point according to the mapping method, set a reference point, a first reference line, and a second reference line according to a preset method through the first point to the third point, generate movement information about a location where a user has moved from a location corresponding to the reference point by using location information received from a user terminal, and train the artificial intelligence algorithm using the movement information.

According to an exemplary embodiment, an entire indoor space where the user terminal is located may be divided into n spaces to form the n divided spaces (where n is a natural number of 3 or more), the first location data may correspond to a first divided space among the n divided spaces, the second location data may correspond to a second divided space among the n divided spaces, the third location data may correspond to a third divided space among the n divided spaces, and the program instructions may further cause the processor to: map the first point to the third point by using location information received from each of the first to third divided spaces.

According to an exemplary embodiment, the memory may further include a two-dimensional coordinate map corresponding to the entire indoor space, and the two-dimensional coordinate map comprises n points respectively corresponding to the n divided spaces.

According to an exemplary embodiment, the reference point may correspond to a center point of a triangle using the first point to the third point as vertices.

According to an exemplary embodiment, the first reference line may correspond to three lines formed by extending from the reference point to each side of the triangle.

According to an exemplary embodiment, the first reference line may correspond to an orthogonal straight line formed by extending orthogonally from the reference point to each side of the triangle, and at least one of the n points may be located on the orthogonal straight line.

According to an exemplary embodiment, when none of the n points is located on the orthogonal straight line, a straight line corresponding to a point located at the closest distance to the orthogonal straight line may be set as the first reference line.

According to an exemplary embodiment, the second reference line may extend between three first reference lines from the reference point and may be set as three extended straight lines, and one of the three extended straight lines equally distributes two interior angles of the three first reference lines.

According to an exemplary embodiment, at least one of the n points may be located on the extended straight lines.

According to an exemplary embodiment, when there is a no-point extended straight line in which none of the n points is located in any one of the three extension straight lines, an extended straight line corresponding to a point located at the closest distance to the no-point extended straight line may be set as one of second reference lines.

According to an exemplary embodiment, the artificial intelligence algorithm may include an algorithm setting a point corresponding to a request location of the user terminal as a current point, setting a triangular point corresponding to the current point, setting a first request line and a second request line using the current point and the triangular point, and predicting a future location corresponding to the request location using the current point, the first request line, and the second request line.

According to an exemplary embodiment, the algorithm may predict the future location by using request location information corresponding to the request location and a request time among all pre-stored location information, wherein the algorithm removes request location information that does not correspond to the current point or is not close to any one of second request lines from the request location information, removes request location information that is not close to any one of first request lines from the remaining request location information, and predicts the future location using the remaining information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
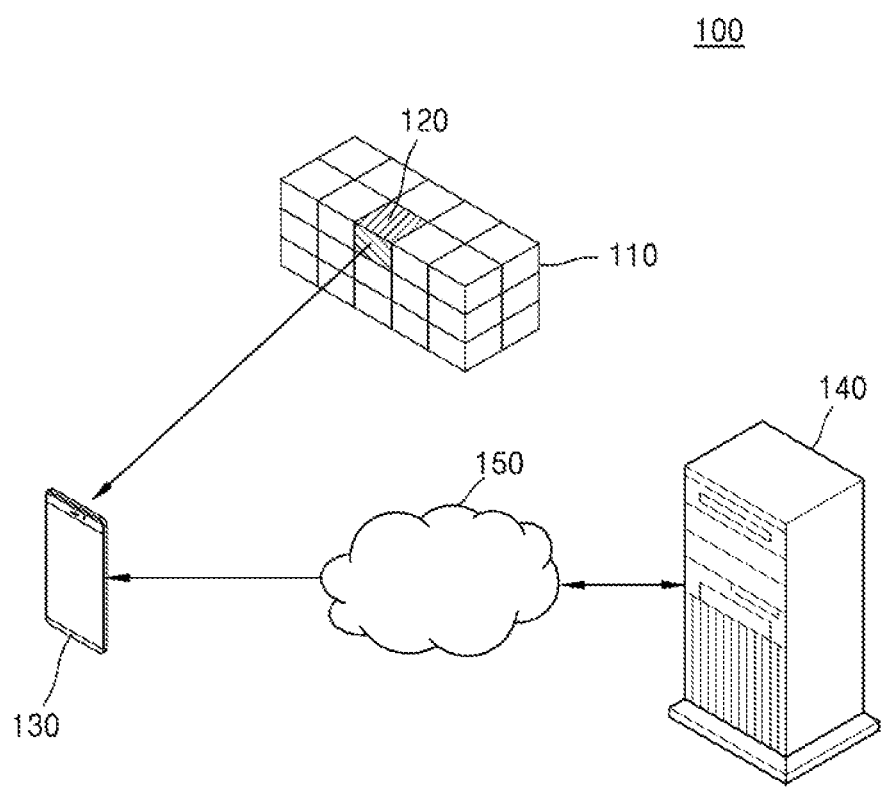
FIG. 1 is a configuration diagram of a spatial location prediction system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one element is "connected" or "accesses" the other element, it is understood that the one element may be directly connected to or may directly access the other element but unless explicitly described to the contrary, another element may be "connected" or "access" between the elements.

In addition, it will be understood that when a unit is referred to as "comprising" another element, it may not exclude the other element but may further include the other element unless specifically oppositely indicated. In addition, terms including "unit," "er," "or," "module," and the like disclosed in the specification mean a unit that processes at least one function or operation and this may be implemented by at least one hardware or software, or a combination of hardware and software.

Reference will now be made in detail to embodiments, examples of which are illustrated in the accompanying drawings.

FIG. 1 is a configuration diagram of a spatial location prediction system according to an embodiment.

Referring to FIG. 1, a spatial location prediction system 100 according to an embodiment may include a user terminal 130 and a spatial location prediction device 140. The user terminal 130 may be connected to the spatial location prediction device 140 via a network 150. The network 150 may be applied regardless of the type of communication network that may connect the user terminal 130 to the spatial location prediction device 140 such as Wifi, Bluetooth, Internet, and a mobile network.

Here, the user terminal 130 may collectively refer to a communication device that may be easily carried by a user, such as a smartphone or a beacon. Accordingly, the user terminal 130 may receive a global positioning system (GPS) and transmit the GPS to the spatial location prediction device 140. In addition, the user terminal 130 may transmit a location identified through a connected Wifi access point (AP) to the spatial location prediction device 140. In addition, the user terminal 130 may tag a beacon recognition device (not shown) located in various places indoors, and the beacon recognition device (not shown) may transmit a location of the user terminal 130 to the spatial location prediction device 140. That is, the user terminal 130 may be applied irrespective of its type, as long as it is a terminal capable of transmitting information about a user's location to the spatial location prediction device 140.

Here, the user terminal 130 may be located in a limited space 110 such as a building. That is, a user may carry the user terminal 130 and move in the limited space 110. The user terminal 130 may transmit its location in the limited space 110 to the spatial location prediction device 140. Here, the user terminal 130 may transmit its location at a certain time period. Alternatively, the user terminal 130 may transmit its own location when a preset event occurs (beacon recognition device tags, etc.).

The spatial location prediction device 140 may be a device such as a server connected to the user terminal 130. The spatial location prediction device 140 may use information about the location (hereinafter referred to as 'location data') received from the user terminal 130 to train an artificial intelligence (e.g., deep-learning) algorithm stored in advance. In addition, the spatial location prediction device 140 may predict a future location of the user terminal 130 using the trained artificial intelligence algorithm. Hereinafter, an operation in which the spatial location prediction device 140 trains the artificial intelligence algorithm (deep-learning algorithm) and predicts the future location of the user terminal 130 will be described with reference to FIGS. 2 to 7.

Figure 2:
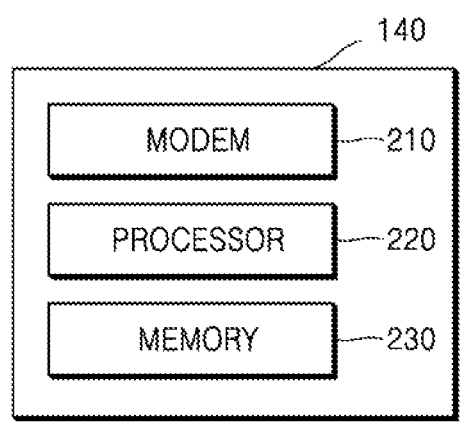
FIG. 2 is a block diagram of a spatial location prediction device according to an embodiment.

FIG. 2 is a block diagram of the spatial location prediction device 140 according to an embodiment.

Referring to FIG. 2, the spatial location prediction device 140 according to an embodiment may include a modem 210, a processor 220, and a memory 230.

The modem 210 may be a communication modem that is electrically connected to other external devices (especially, the user terminal 130) to enable mutual communication. In particular, the modem 210 may output 'location data' received from the user terminal 130 to the processor 220, and the processor 220 may store the location data in the memory 230.

The memory 230 is a configuration in which various information and program instructions for the operation of the spatial location prediction device 140 are stored, and may be a storage device such as a hard disk or a solid state drive (SSD). In particular, the memory 230 may store one or more pieces of location data received from the modem 210 under the control of the processor 220. Also, the memory 230 may store a deep-learning algorithm for executing a future location prediction operation executable by the processor 220.

The processor 220 may predict a user's future location using information and program instructions stored in the memory 230. Hereinafter, the prediction operation of the processor 220 will be described in detail.

Figure 3:
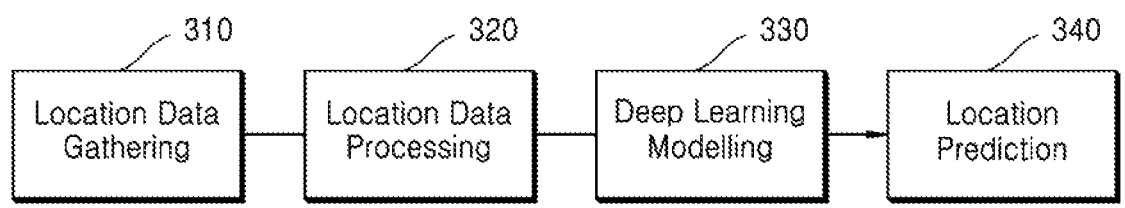
FIG. 3 is an operation flowchart for explaining an operation of a spatial location prediction device according to an embodiment.

FIG. 3 is an operation flowchart for explaining an operation of the spatial location prediction device 140 according to an embodiment.

FIG. 3 illustrates an operation flow for explaining an operation for the processor 220 of the spatial location prediction device 140 according to an embodiment to predict a user's spatial location.

First, in operation 310, the processor 220 may collect and organize location data (Location Data Gathering). For example, the processor 220 may store location data received from the user terminal 130 through the modem 210 in the memory 230.

In addition, in operation 320, the processor 220 may generate data to train a deep-learning algorithm by processing the location data (Location Data Processing).

First, the processor 220 may select three pieces of location data received from the user terminal 130 and then map a three-dimensional space corresponding to the selected three pieces of location data to a two-dimensional plane according to a preset method. Hereinafter, an operation in which the processor 220 maps location data to a two-dimensional plane will be described with reference to FIGS. 4 and 5.

Figure 4:
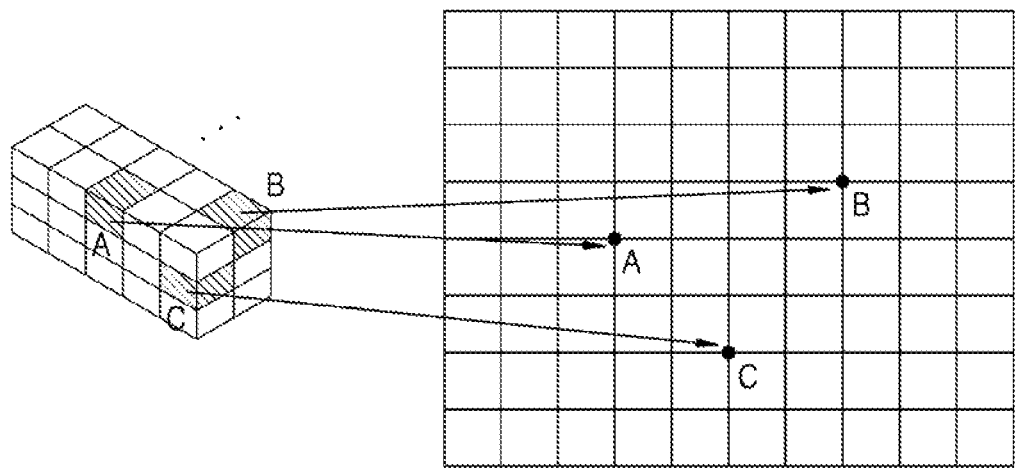
FIGS. 4 and 5 are exemplary views for explaining a method of mapping a user's three-dimensional location to a two-dimensional plane.
Figure 4:
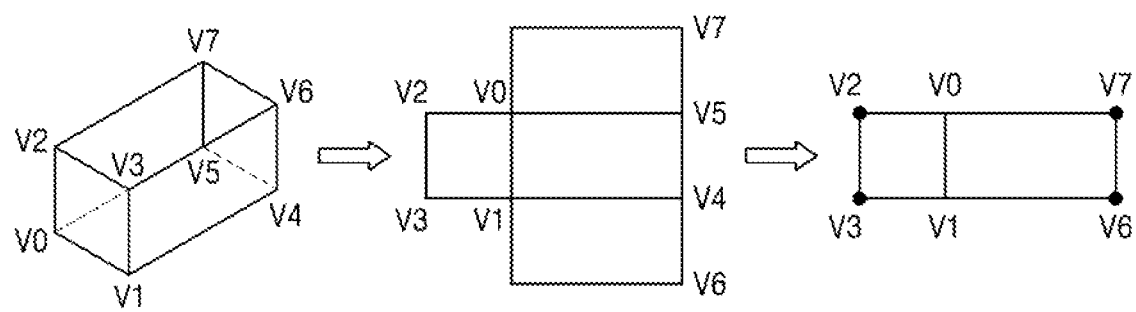
Figure 5:
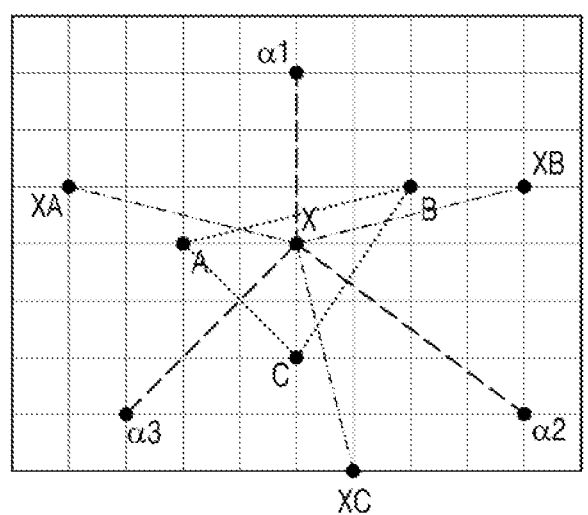

FIGS. 4 and 5 are exemplary views for explaining a method of mapping a user's three-dimensional location to a two-dimensional plane.

As illustrated in FIG. 4, in the disclosure, the user's three-dimensional location may be mapped to the two-dimensional plane through a correlation coefficient for dimension. According to the example of FIG. 4, a limited indoor space may be divided into n preset spaces (However, n is a natural number of 3 or more). The method of dividing the indoor space into n divided spaces may be various. For example, when an indoor space is physically partitioned, one physically partitioned space may be set as a divided space. For another example, when an indoor space is not physically partitioned, the indoor space may be partitioned through a virtual line, and then the partitioned indoor spaces may be set as divided spaces.

Accordingly, the processor 220 may match the n divided spaces set by partitioning the limited indoor space to the two-dimensional plane according to a preset method. For example, it is assumed that a two-dimensional coordinate map corresponding to the two-dimensional plane is previously stored in the memory 230. In the two-dimensional coordinate map, n points may be preset, and each point may be matched in advance to each divided space. That is, a first point may be pre-matched with a first divided space, a second point may be pre-matched with a second divided space, and an $n^{th}$ point may be pre-matched with an $n^{th}$ divided space. In the case of FIG. 4, A, B, and C, which are different divided spaces, may be matched with points preset in advance, respectively.

As another example, as illustrated at the bottom of FIG. 4, among corners of divided spaces set to a hexahedron, each of the divided spaces may be defined through four characteristic corners and may be matched with a corresponding point among points of the two-dimensional coordinate map. In the example of FIG. 4, eight corners of an arbitrary divided space may be defined as V0, V1, V2, V3, V4, V5, V6, and V7. In addition, after the divided space is developed, the divided space may be converted into a rectangle again as illustrated in FIG. 4. After the divided space is converted to the rectangle, four corners, namely V2, V3, V6, and V7, may be set as characteristics of the corresponding divided space. Thereafter, the processor 220 may be matched with a corresponding point among the points of the two-dimensional coordinate map using the set characteristics.

As illustrated in FIG. 4, the processor 220 may set any point among a plurality of points of the two-dimensional coordinate map as a point corresponding to A by using characteristics of the divided space A (referred to as a 'first point'). Thereafter, the processor 220 may set a point corresponding to B (referred to as a 'second point') by reflecting a result of comparing characteristics of the divided space B and the characteristics of divided space A to point A. In addition, the processor 220 may set a point corresponding to C (referred to as a 'third point') by reflecting a result of comparing characteristics of a divided space C and the characteristics of the divided space A to point A. Because the method of setting the first to third points (i.e., a method of redefining a three-dimensional space value and convert it into a two-dimensional location value) may be various, a detailed description thereof will be omitted.

In addition, the processor 220 may generate a reference point, a first reference line, and a second reference line according to a method which is preset through first to third points mapped in two dimensions. Here, the first to third points may be points set corresponding to pieces of location data received from the user terminal 130. That is, the user terminal 130 may transmit first location data from the divided space A to the spatial location prediction device 140. Also, the user terminal 130 may transmit second location data from the divided space B to the spatial location prediction device 140. Also, the user terminal 130 may transmit third location data from the divided space C to the spatial location prediction device 140. Accordingly, the processor 220 may map the first location data to the first point of the two-dimensional coordinate map, may map the second location data to the second point of the two-dimensional coordinate map, and may map the third location data to the third point of the two-dimensional coordinate map.

Referring to FIG. 5, the processor 220 may set a triangle having the first to third points as vertices, and may set a center point of the triangle as a reference point X. Meanwhile, the center point of the triangle may not be a point of the two-dimensional coordinate map. That is, there may be no point in the two-dimensional coordinate map that matches the center point of the triangle. In this case, a point closest to the center point may be set as the reference point X.

Also, the processor 220 may set three lines formed by extending from the reference point X to each side of the triangle as first reference lines'. For example, the processor 220 may form a first straight line (first orthogonal straight line) in which a first side' connecting the first point and the second point of the triangle and the reference line intersect at a right angle, and then may set the first straight line to one ($\alpha$1) of the first reference lines. Here, a point of the two-dimensional coordinate map may not be located in the first orthogonal straight line. That is, there may be no point of the two-dimensional coordinate map on the first orthogonal straight line. In this case, a point closest to the first orthogonal straight line may be set, and a straight line connecting the set point to the reference point X may be set as one of the first reference lines.

In the same way, the processor 220 may form a second straight line (second orthogonal straight line) in which a second side' connecting the second point and the third point of the triangle and the reference line intersect at a right angle, and then may set the second orthogonal line as one ($\alpha$2) of the first reference lines. In addition, the processor 220 may form a third straight line (third orthogonal straight line) in which a third side' connecting the third point and the first point of the triangle and the reference line intersect at a right angle, and then may set the third orthogonal straight line as one (β3) of the first reference lines.

Also, the processor 220 may set three straight lines (i.e., extended straight lines) extending from the reference point X between the three first reference lines as second reference lines. For example, the processor 220 may set a first extended straight line that equally distributes an interior angle of a first-1 reference line and a first-2 reference line among three reference lines (i.e., first-1 reference line to first-3 reference line) as one of the second reference lines. At this time, a point of the two-dimensional coordinate map may not be located on the first extended straight line. That is, there may be no point of the two-dimensional coordinate map on the first extended line. In this case, a point XA closest to the first extended straight line may be set, and a straight line connecting the set point to the reference point X may be set as one (XA) of the second reference lines.

In the same way, the processor 220 may set a second extended straight line that equally distributes an interior angle of the first-2 reference line and the first-3 reference line as one (XB) of the second reference lines. In addition, the processor 220 may set a third extended straight line that equally distributes an interior angle of the first-3 reference line and the first-1 reference line as one (XC) of the second reference lines. Of course, when there is a no-point extended straight line where no point is located on the extended straight lines, it is obvious that a point closest to the extended line and the reference point X may be set as one of the second reference lines.

Thereafter, the processor 220 may use the location data received from the user terminal 130 to store movement information that a user has moved from the reference point X.

For example, it is assumed that $a^{th}$ location data corresponding to a time that has elapsed by time a is received after the reference point is set. At this time, the processor 220 may map the $a^{th}$ location data to a corresponding point in the two-dimensional coordinate map. In addition, the processor 220 may connect the mapped two-dimensional coordinate map point to the reference point, and may select a reference line closest to the connected line (i.e., may select any one of α1 to α3, XA, XB, and XC closest to the connected line). Thereafter, the processor 220 may generate movement information by matching a time, a point (or divided space), and a selected reference line of the $a^{th}$ location data. Also, the processor 220 may store the generated movement information in the memory 230.

Through this method, the processor 220 may generate and store movement information whenever location data is received from the user terminal 130.

In addition, the processor 220 may generate new movement information by changing a reference point. For example, when one or more of the first to third location data are set differently, the reference point may be different. When the reference point is changed, the first reference line and the second reference line may be different. Accordingly, the processor 220 sets one or more of the first to third location data differently, and may generate user's movement information after a time at which a user is located at the last of the first to third location data.

Referring again to FIG. 3, in operation 330, the processor 220 may train a deep-learning algorithm provided using generated movement information (Deep Learning Modeling). The deep-learning algorithm may use pre-stored user's movement information to learn a point where a user is located after a certain time from the reference point. That is, the deep-learning algorithm may learn which divided space the user is mainly located after a certain time from a location of the reference point.

Thereafter, in operation 340, the processor 220 may predict a user's future location using a deep-learning algorithm (Location Prediction). That is, the processor 220 may set last location data from a user terminal as the reference point to predict which point a user will be located after a certain time t from the reference point. Hereinafter, an operation of the processor 220 to predict a spatial location will be described in detail with reference to FIGS. 6 and 7.

Figure 6:
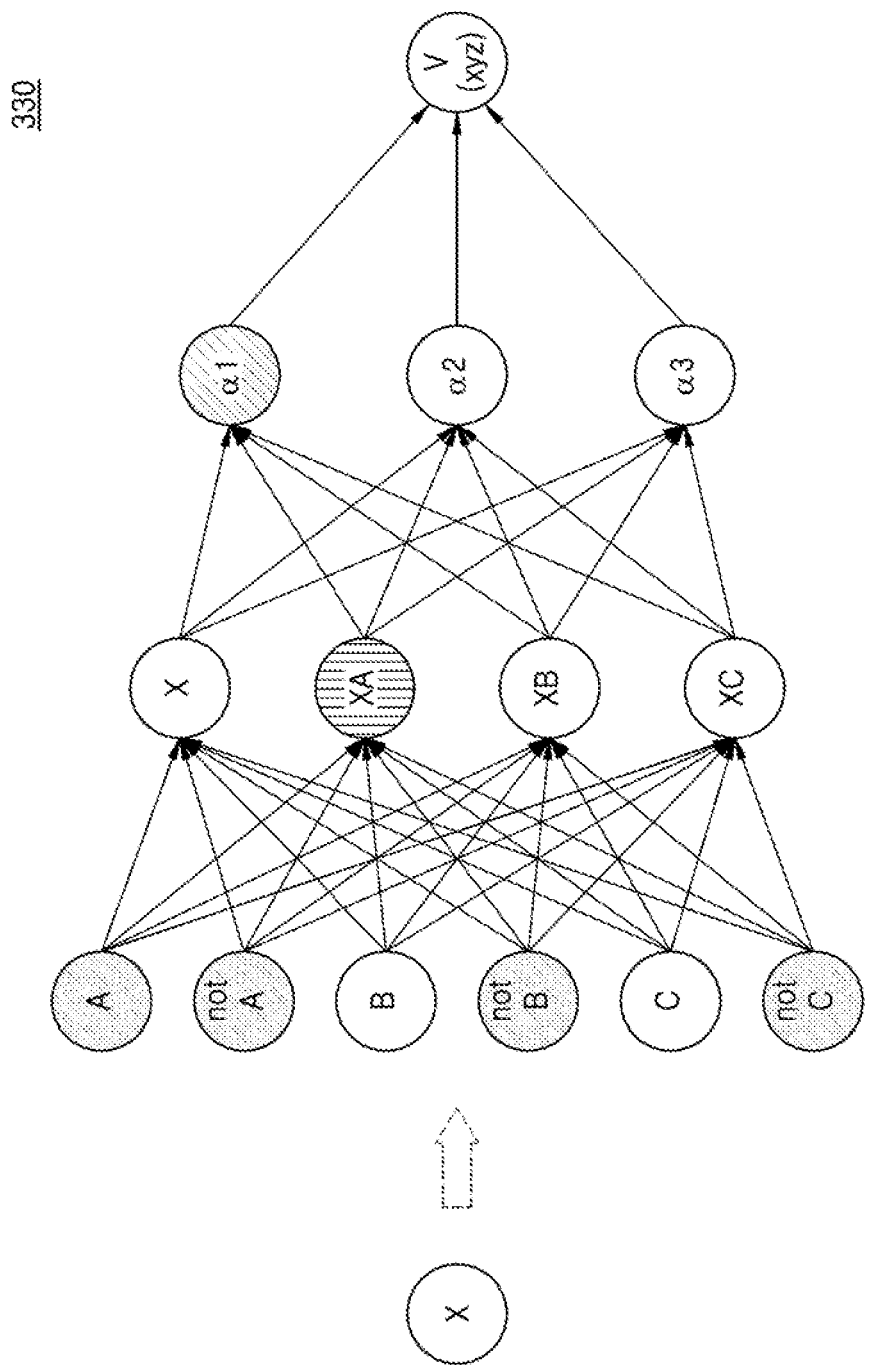
FIGS. 6 and 7 are tables for explaining an operation for predicting a spatial location through an artificial intelligence algorithm according to an embodiment.
Figure 7:
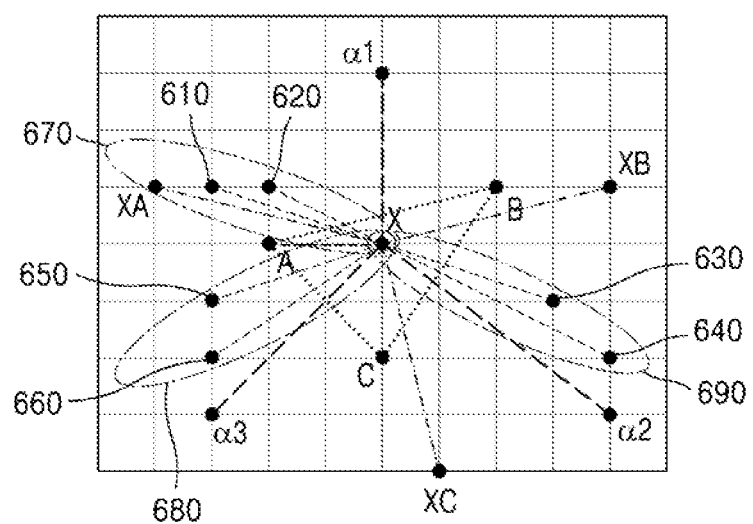

FIGS. 6 and 7 are tables for explaining an operation for predicting a spatial location through a deep-learning algorithm according to an embodiment.

First, the processor 220 may map last location data (i.e., location data corresponding to a requested location to predict a future location) to a two-dimensional coordinate map. The matched point may be set as a current point X. That is, a user's last location may be a location corresponding to the current point X.

Also, the processor 220 may set a first point A, a second point B, and a third point C as triangular points based on the current point X. For example, the processor 220 may read a corresponding point using location information previously stored in the memory 230. That is, the processor 220 may read points corresponding to divided spaces in which a user is previously located. In addition, the processor 220 may set three points having the current point X as a center point among the read points as triangular points. That is, the newly set first point A, second point B, and third point C may use the current point X corresponding to the user's last location as a center point. In addition, the processor 220 may set a first request line and a second request line using the current point X, the first point A, the second point B, and the third point C.

The operation in which the processor 220 sets the first point A, the second point B, and the third point C as triangular points may be similar to the above-described operation. In addition, because the operation of setting the first request line and the second request line may be similar to an operation of setting the first reference line and the second reference line, detailed descriptions thereof will not be given herein.

Thereafter, the processor 220 may predict a "user's location after a request time has elapsed from a time at which the last location data is received" using the current point X and the request time as input values of the deep-learning algorithm. That is, the processor 220 may analyze an existing user's moving path to predict a point where a user is likely to be located after the request time has elapsed from the current point X.

Referring to FIG. 6, first, the processor 220 may classify movement information corresponding to the current point X into corresponding movement information among A, B, C, not A, not B, and not C through the deep-learning algorithm. In the example of FIG. 7, points (610, 620, 630, 640, 650, 660, and A) may be request location information corresponding to the current point X and the request time among movement information stored in the memory 230. That is, a user has previously been located at the points after a set time from the current point X. When the points (i.e., request location information) are classified primarily, the points may be classified as A, not A, not B, and not C. That is, there are no points corresponding to B and C.

Thereafter, the processor 220 may secondarily classify primarily read and classified movement information (i.e., the points) into request information corresponding to a current point and a secondary request line through a deep-learning algorithm. In the example of FIG. 7, a first point 610 and a second point 620 correspond to a second-1 request line XA in 670 among second request lines. That is, among the plurality of points, the first point 610 and the second point 620 are points closest to the first request line. Accordingly, the processor 220 may read only points at or below a preset distance based on the second request lines among the plurality of points using the deep-learning algorithm. In addition, the processor 220 may classify the read points into the corresponding second request lines (or current points). In the example of FIG. 7, only the first point 610 and the second point 620 are points at or below a preset distance, and other points 630 to 660 and A do not correspond to the second request lines. Accordingly, the processor 220 may read only the first point 610 and the second point 620 as remaining request location information, and may remove the remaining points.

Thereafter, the processor 220 may finally classify residual request location information that is secondarily read through the deep-learning algorithm (i.e., the points) into request location information corresponding to the primary request line. In the example of FIG. 7, only the first point 610 and the second point 620 are read, and among the read points, the second point 620 closest to a first-1 request line $\alpha 1$ (i.e., located within a preset distance) may be read.

In the example of FIG. 7, a third point 630 and a fourth point 640 correspond to a first-2 request line $\alpha 2$ in 690, and a fifth point 650 and a sixth point 660 correspond to a first-3 request line $\alpha 3$ in 680, but these points 630 to 660 are points that do not correspond to the second request lines and the current points and have been removed secondarily, and therefore cannot be recognized as points corresponding to the first request line.

Thereafter, the processor 220 may predict the finally read second point 620 as a point corresponding to a user's future location.

The more the movement information stored in the memory 230, the more information about a direction and/or a location of a user moving from the current point X, so there will be a lot of information about user's movement habits. User's habits may become stronger in emergencies such as fires and/or earthquakes. Therefore, it is obvious that the accuracy of future location prediction based on the user's habits will increase as the number of movement information increases.

Thereafter, the processor 220 may substitute the point corresponding to the user's future location with a three-dimensional divided space again, and may output a location corresponding to the substituted divided space to a user's location (e.g., the number) after a set time.

A method of predicting a user's location after a certain time by the spatial location predicting device 140 according to the above-described embodiment may be embodied as computer-readable codes on a non-transitory computer-readable recording medium. The non-transitory computer-readable recording medium is any recording medium that stores data which may thereafter be read by a computer system. The non-transitory computer-readable recording medium may include, for example, read-only memory (ROM), random-access memory (RAM), magnetic tapes, magnetic disks, flash memory, optical data storage devices, etc. The non-transitory computer-readable recording medium may also be distributed over computer network-coupled computer systems so that a computer-readable code is stored and executed in a distributive manner.

A method of predicting a spatial location using artificial intelligence and a device thereof according to the disclosure may predict a user's location in the event of a disaster by integrating artificial intelligence technology and positioning technology, so that a user located indoors during the disaster such as a fire or earthquake may be more effectively rescued.

While the embodiments have been particularly shown and described, it will be understood by one of ordinary skill in the art that various changes in form and details may be made therein without departing from the spirit and scope of the disclosure as defined by the appended claims.

What is claimed is:

1. A spatial location prediction device comprising:
a processor; and
a memory connected to the processor and storing an artificial intelligence algorithm, first location data, second location data, and third location data,
wherein the memory stores program instructions which, when executed by the processor, cause the processor to:
two-dimensionally map the first location data to a first point according to a preset mapping method,
two-dimensionally map the second location data to a second point according to the mapping method,
two-dimensionally map the third location data to a third point according to the mapping method,
set a reference point, a plurality of first reference lines, and a plurality of second reference lines according to a preset method through the first point to the third point,
generate movement information about a location where a user has moved from a location corresponding to the reference point by using location information received from a user terminal, and
train the artificial intelligence algorithm using the movement information,
wherein the movement information is generated based on a two-dimensionally mapped point of the location where the user has moved and a reference line which is closest from the two-dimensionally mapped point among the plurality of first reference lines and the plurality of second reference lines.

2. The spatial location prediction device of claim 1, wherein an entire indoor space where the user terminal is located is divided into n spaces to form the n divided spaces (where n is a natural number of 3 or more),
the first location data corresponds to a first divided space among the n divided spaces,
the second location data corresponds to a second divided space among the n divided spaces,
the third location data corresponds to a third divided space among the n divided spaces, and
the program instructions further cause the processor to:
map the first point to the third point by using location information received from each of the first to third divided spaces.

3. The spatial location prediction device of claim 2, wherein the memory further comprises a two-dimensional coordinate map corresponding to the entire indoor space, and
the two-dimensional coordinate map comprises n points respectively corresponding to the n divided spaces.

4. The spatial location prediction device of claim 3, wherein the reference point corresponds to a center point of a triangle using the first point to the third point as vertices.

5. The spatial location prediction device of claim 4, wherein the plurality of first reference lines include three lines formed by extending from the reference point to each side of the triangle.

6. The spatial location prediction device of claim 5, wherein the plurality of first reference lines include orthogonal straight lines formed by extending orthogonally from the reference point to each side of the triangle, and at least one of the n points is located on each of the orthogonal straight lines.

7. The spatial location prediction device of claim 6, wherein when none of the n points is located on a first orthogonal straight line of the orthogonal straight lines, a straight line corresponding to a point located at the closest distance to the first orthogonal straight line is set as the first reference line corresponding to the first orthogonal straight line.

8. The spatial location prediction device of claim 7, wherein the plurality of second reference lines extend between the plurality of first reference lines from the reference point and are set as extended straight lines, and one of the extended straight lines equally distributes two interior angles of the plurality of first reference lines.

9. The spatial location prediction device of claim 8, wherein at least one of the n points is located on the extended straight lines.

10. The spatial location prediction device of claim 9, wherein when there is a no-point extended straight line in which none of the n points is located in any one of the extension straight lines, an extended straight line corresponding to a point located at the closest distance to the no-point extended straight line is set as one of second reference lines.

11. The spatial location prediction device of claim 1, wherein the artificial intelligence algorithm comprises:
an algorithm setting a point corresponding to a request location of the user terminal as a current point, setting a triangular point corresponding to the current point, setting a first request line and a second request line using the current point and the triangular point, and predicting a future location corresponding to the request location using the current point, the first request line, and the second request line.

12. The spatial location prediction device of claim 11, wherein the algorithm predicts the future location by using request location information corresponding to the request location and a request time among all pre-stored location information,
wherein the algorithm removes request location information that does not correspond to the current point or is not close to any one of second request lines from the request location information, removes request location information that is not close to any one of first request lines from the remaining request location information, and predicts the future location using the remaining information.

\* \* \* \* \*